TIME DIVISION MULTIPLEX CHANNEL PULSE DISTRIBUTOR

Filed July 29, 1965

INVENTORS.
AMES F. GIORDANO
BY WALTER H. CALDWELL
Alfred C. Hill
AGENT

INVENTORS.
AMES F. GIORDANO
WALTER H. CALDWELL
BY Alfred C. Hill
AGENT

TIME DIVISION MULTIPLEX CHANNEL PULSE DISTRIBUTOR

Filed July 29, 1965 Sheet 3 of 4

INVENTORS.
AMES F. GIORDANO
WALTER H. CALDWELL
BY Alfred C. Hill
AGENT

TIME DIVISION MULTIPLEX CHANNEL PULSE DISTRIBUTOR

INVENTORS.
AMES F. GIORDANO
BY WALTER H. CALDWELL
Alfred C. Hill
AGENT 3,441,674
Patented Apr. 29, 1969

3,441,674

TIME DIVISION MULTIPLEX CHANNEL PULSE DISTRIBUTOR

Ames F. Giordano, Newark, and Walter H. Caldwell, Kenilworth, N.J., assignors to International Telephone and Telegraph Corporation, Nutley, N.J., a corporation of Maryland Filed July 29, 1965, Ser. No. 475,679
Int. Cl. H04m *5/04;* H04j *1/02*
U.S. Cl. 179—15 18 Claims

ABSTRACT OF THE DISCLOSURE

There is disclosed a TDM system for combining several wideband signals and several narrow band signals into one frame of a composite pulse modulated TDM channel signal. It employs pulse modulation with a rapid sampling rate for the wideband channels in combination with a slow sampling rate for the narrow band channels. The heart of the multiplexer and demultiplexer is the pulse distributor which delivers channel timing pulses at a rapid repetition rate to each of several wideband pulse modulators and also delivers channel timing pulses at a slow repetition rate to each of several narrow band pulse modulators. The combined output makes efficient use of its bandwidth by matching sampling rate to signal bandwidth. The channel pulses of rapid repetition rate are produced by time coincidence of master clock pulses and certain ones of a plurality of different timing pulses derived from the master pulses while the slow repetition rate channel pulses are produced by time coincidence of the master pulses, others of the plurality of timing pulses and at least one channel pulse of rapid repetition rate.

This invention relates to time division multiplex systems and more particularly to a channel pulse distributor for such systems enabling the multiplexing and demultiplexing of channel signals of different repetition rates in each frame of a time division multiplex signal.

Prior-art time division multiplex (TDM) systems have in the past employed a single repetition rate for all channels contained in a frame of a time multiplex signal. This arrangement wasted information transmission capacity when narrow band signals (low sampling rate signals) were fed through wide band channels (channels derived from a rapid sampling rate).

These previous TDM systems and the TDM system employing the channel pulse distributor of the present invention multiplex a plurality of different analog signals, such as audio signals, each of which is sampled by its particular modulator which in turn produces a pulse modulated output representative of the amplitude of the analog signal. The pulse modulated output could be a pulse amplitude modulated output, a pulse width modulated output, a pulse time modulated output, a pulse code modulated output, or the like.

An object of this invention is to provide a channel pulse distributor for use in time division multiplex systems which provide in each frame of a multiplex signal a combined channel output which makes efficient use of the bandwidth by matching sampling rates to signal bandwidth.

Another object of this invention is the use of a channel pulse distributor enabling the combining of several wide band signals and several narrow band signals into a composite time division multiplex frame.

Still another object of this invention is to provide a channel pulse distributor producing channel pulse having a rapid sampling rate for several wide band channels and a slow rate for narrow band channels wherein the resultant channel pulses of both the rapid and slow sampling rate are combined into each frame of a time division multiplex signal.

A further object of this invention is the provision of a channel pulse distributor which enables a more efficient use of bandwidth for a time division multiplex signal than the prior art by combining within each frame of the time division multiplex signal several groups of channels of rapid sampling rate for wideband modulation and several groups of channels of slow sampling rate for narrow band modulation.

A feature of this invention is the provision of channel pulse distributor for time division multiplex systems comprising first means to produce for each frame of a time division multiplex signal a first plurality of channel pulses having a first given repetition rate and second means coupled to the first given means to produce for each frame of the multiplex signal a second plurality of channel pulses having a second given repetition rate different from said first given repetition rate.

Another feature of this invention is the provision of a channel pulse distributor incorporating in addition to the first and second means above a third means coupled to these first and second means to produce frame pulses to define time division multiplex frames each of which encompasses the first and second plurality of channel pulses.

A further feature of this invention is the provision of a channel pulse distributor, as above defined, wherein the first plurality of channel pulses is coupled in parallel to given ones of plurality of modulator means and given ones of a plurality of demodulator means and an arrangement to couple the second plurality of channel pulses in parallel to others of the modulator means and others of the demodulator means.

Still another feature of this invention is the provision of a channel pulse distributor including a source of master timing pulses having a predetermined repetition rate which at the multiplexer is a generator of this master timing pulse and at the demultiplexer is the time division multiplex signal which includes therein synchronizing signals for the different plurality of channel signals occurring at the repetition rate of the master timing pulses. A third means is provided to produce a plurality of timing pulses having different repetition rates predeterminedly related to the predetermined repetition rate of the master timing pulses with fourth means coupled to the source and third means to produce the first plurality of channel pulses and fifth means coupled to the source, the third means and the fourth means to produce the second plurality of channel pulses.

Still a further feature of this invention is the provision of a means coupled to the source to provide a fine synchronizing signal for each of a plurality of groups of channel pulses of the first repetition rate and each of a plurality of groups of channel pulses of the second repetition rate.

Still another further feature of this invention is the provision of a means coupled to one of the arrangements for generating the groups of channel pulses and the means producing the timing pulses to produce a frame synchronizing signal which defines the frame of the time division multiplex signal which incorporate each of the groups of plurality of channel pulses having the first and second repetition rates.

Another feature of this invention is the provision of a channel pulse distributor including a means responsive to the time coincidence of the master timing pulse and selected ones of the plurality of timing pulses to produce the first plurality of groups of channel pulses at a first repetition rate and another means responsive to the time coincidence of the master timing pulse and others of the plurality of timing pulses and at least one channel pulse of the first plurality of groups of channel pulses to produce the second plurality of groups of channel pulses occurring at a second predetermined repetition rate.

Still another feature of this invention is the provision of a source of time division multiplex signal comprising frame synchronizing signals defining the frame of the multiplex signal, a first plurality of groups of channel signal having a first given repetition rate included in each of the frames, a second plurality of groups of channel signals having a second given repetition rate different than said first given repetition rate included in each of the frames and a fine synchronizing pulse signal for each group of the first and secnod plurality of groups of channel signals. A means is coupled to this source to detect the frame pulses and the fine synchronizing pulses and another means is provided to produce a plurality of timing signals having different repetition rates predeterminedly related to the repetition rate of the fine synchronizing pulses. Still a further means is coupled to the means to detect and means producing the timing pulses to produce the first plurality of groups of channel pulses and still another means is coupled to the means to detect and the means producing the timing pulses and the means for producing the first plurality of groups of channel pulses to produce the second plurality of groups of channel pulses. The means to produce a plurality of timing pulses is synchronized by the detection of the frame synchronizing pulses while the means to produce the first plurality of groups of channel pulses is responsive to the time coincidence of the fine synchronizing pulses and selected ones of the plurality of timing pulses to produce the first plurality of groups of channel pulses and the means to produce the second plurality of groups of channel pulses is responsive to the time coincidence of the fine synchronizing pulses, others of said plurality of timing pulses, and at least one channel pulse of the first plurality of groups of channel pulses to produce the second plurality of groups of channel pulses.

The above-mentioned and other features and objects of this invention will become more apparent by reference to the following description taken in conjunction with the accompanying drawings, in which.

Figure 3:
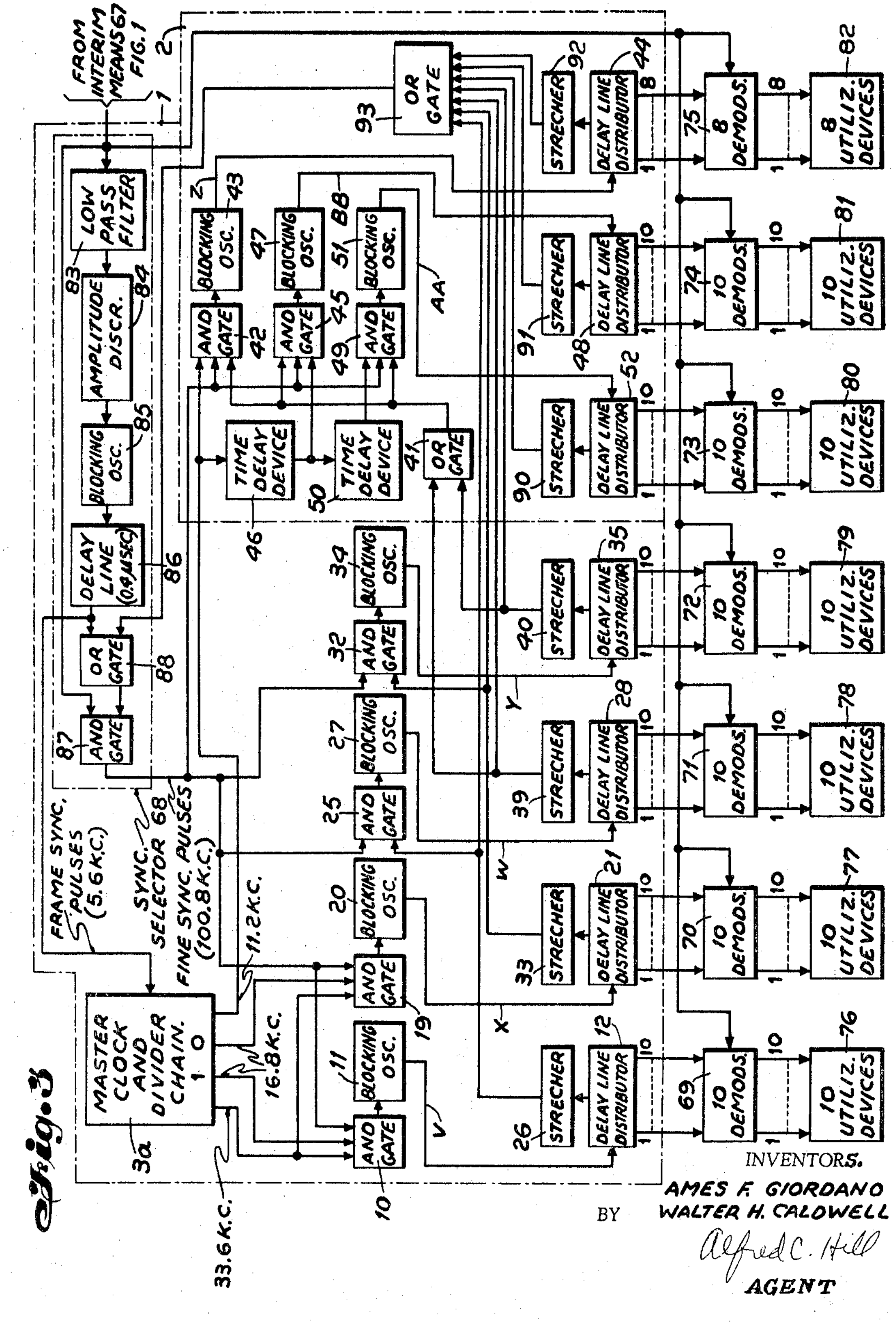
Figure 4:
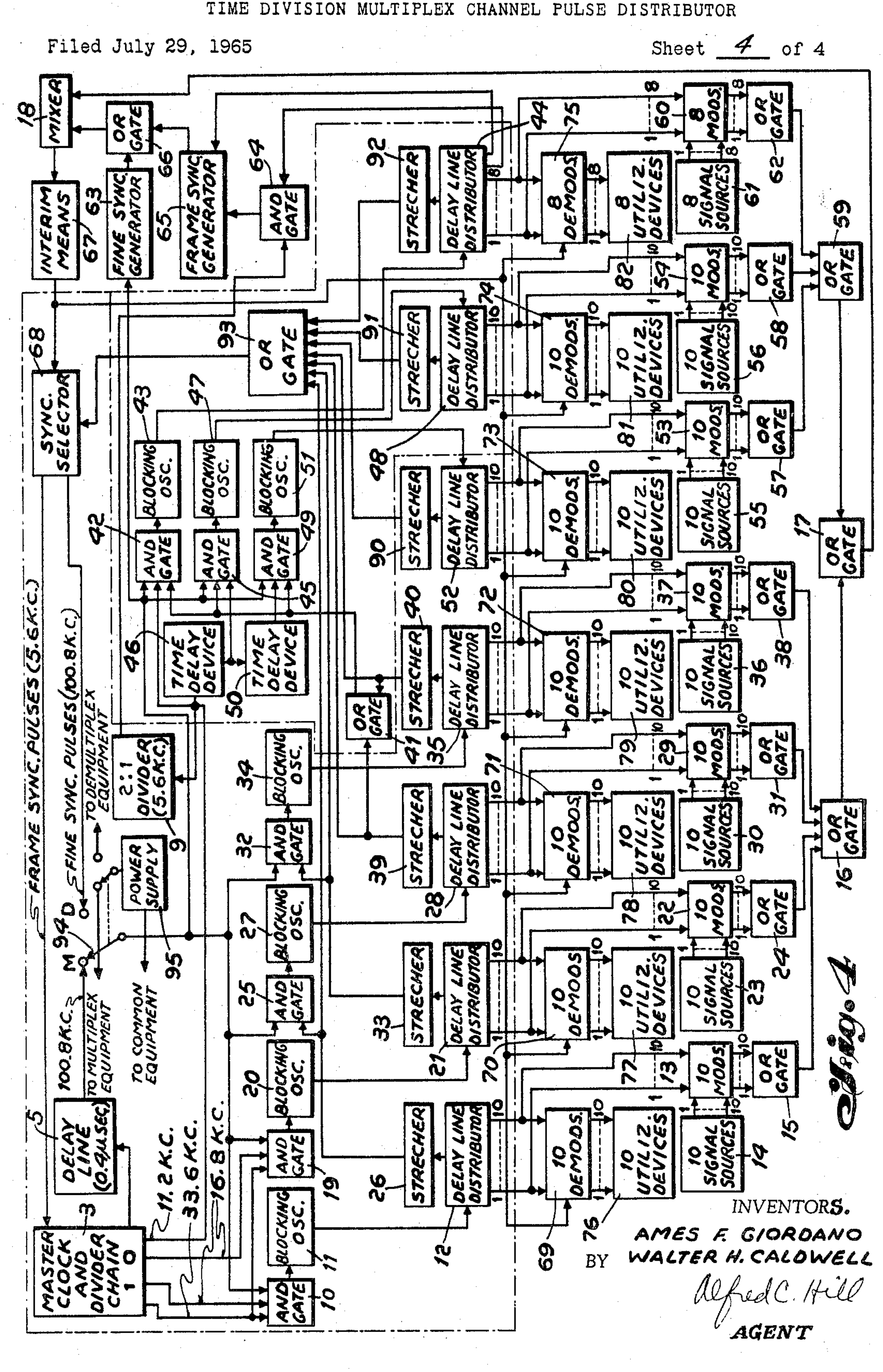

FIG. 3 is a schematic diagram in block form illustrating the channel pulse distributor in accordance with the principles of this invention as incorporated in the demultiplexing portion of a time division multplex system; and FIG. 4 is a schematic diagram in block form showing a multiplexer-demultiplexer arrangement utilizing the channel pulse distributor in accordance with the principles of this invention.

The various figures of the drawing illustrate therein frequencies and time spacing between the various pulses. It is to be understood that these values presented are a non-limiting example to aid in describing the operation of the channel pulse distributor in accordance with the principles of this invention.

Figure 1:
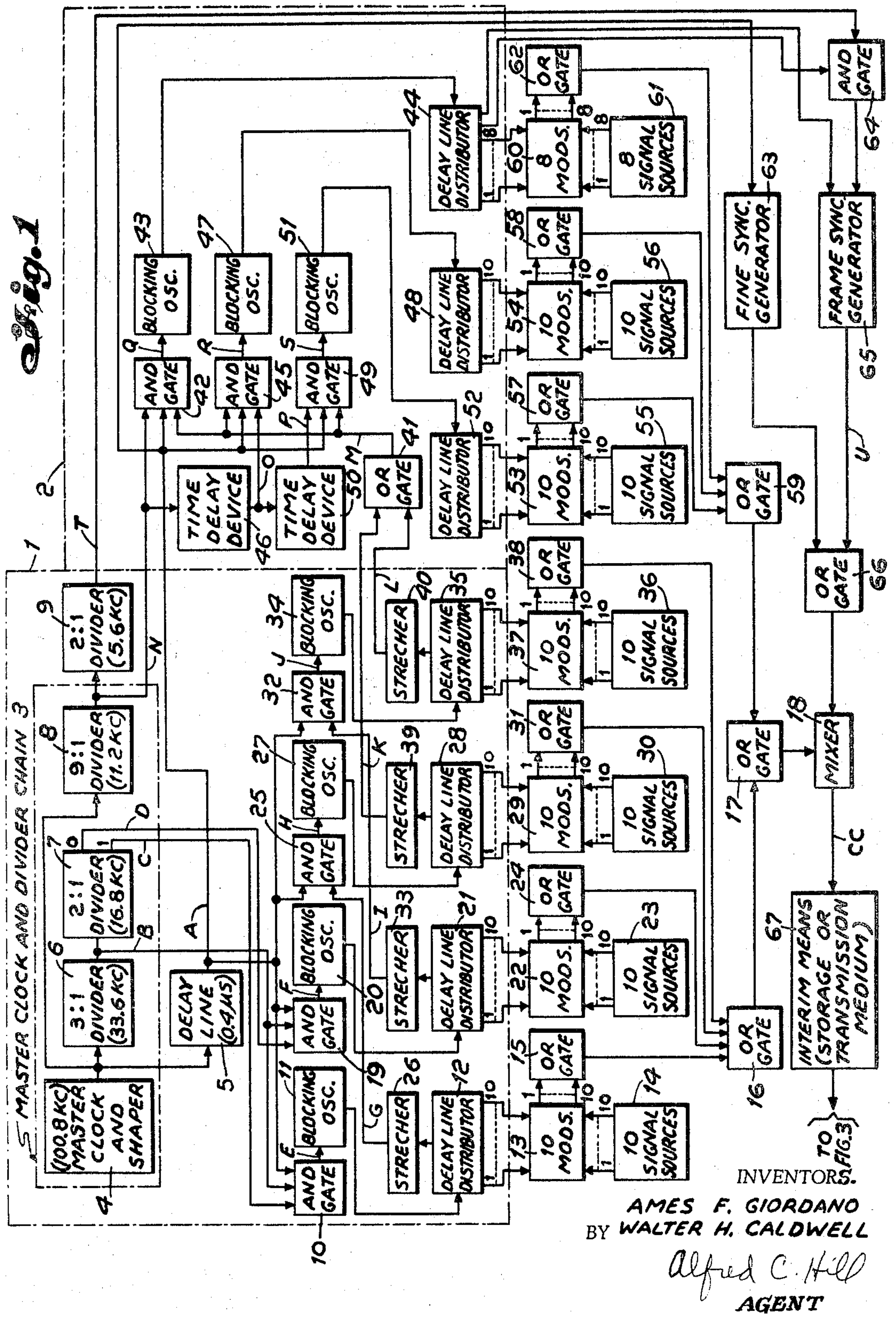
FIG. 1 is a schematic diagram in block form illustrating the channel pulse distributor in accordance with the principles of this invention for utilization in the multiplexing portion of a time division multiplex system.

Referring to FIGURE 1, there is illustrated therein a channel pulse distributor in accordance with the principles of this invention including a first means 1 to produce for each frame of a time division multiplex signal a first plurality of channel pulses having a first given repetition rate and a second means 2 coupled to said first means 1 to produce for each frame of the multiplex signal a second plurality of channel pulses having a second given repetition rate different than the first given repetition rate.

Figure 2:
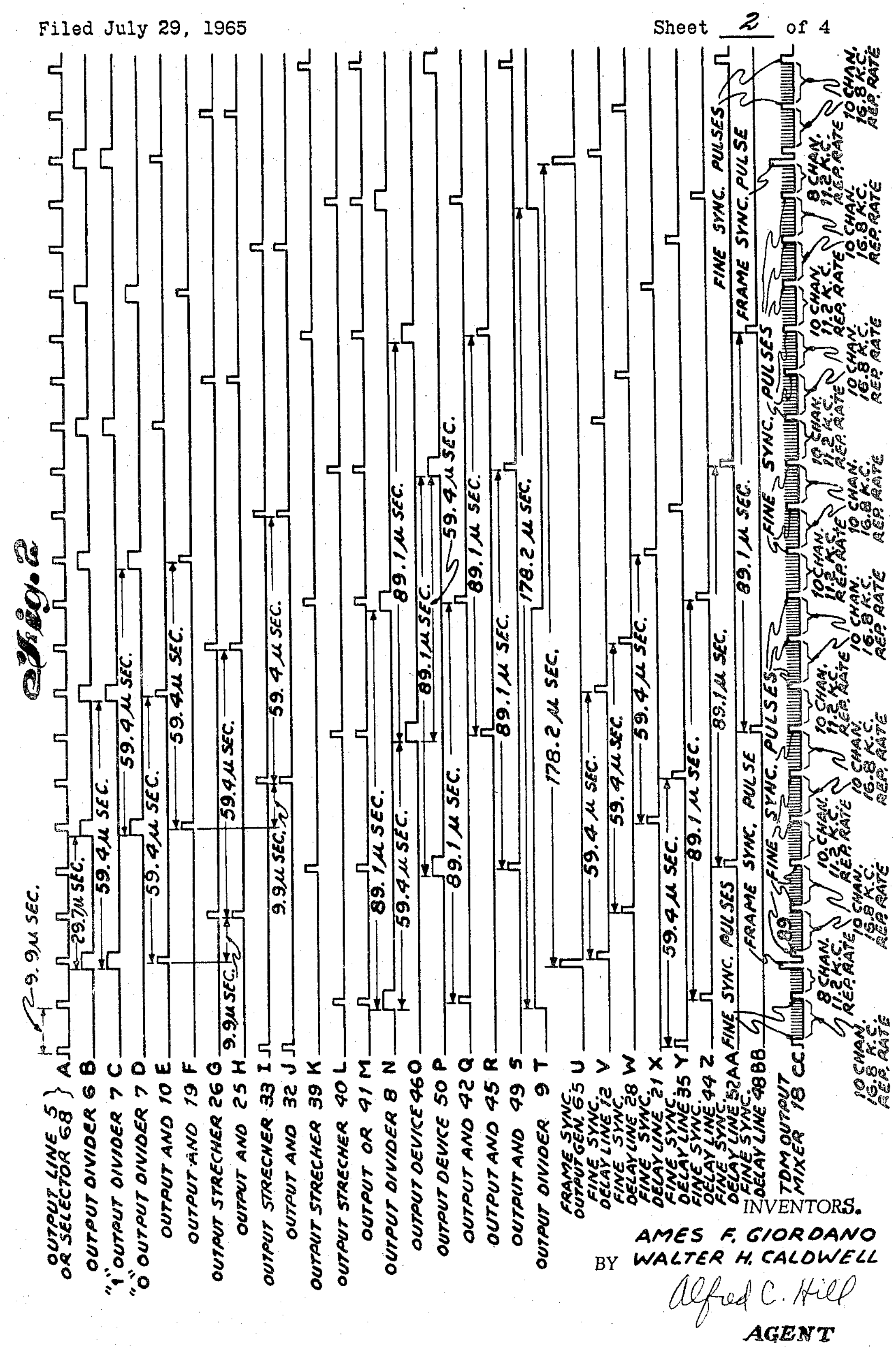
FIG. 2 is a timing diagram showing the output at various points in the systems of FIG. 1 and the system of FIG. 3.

Referring with greater particularity to FIG. 1, the means 1 is illustrated as including a master clock and divider chain 3 including a master clock and shaper 4 having a given basic frequency output illustrated as being 100.8 kc. The output from clock 4 is coupled directly to a delay line 5 whose output is illustrated in curve A, FIG. 2. The output from clock 4 also coupled to a 3:1 divider 6, such as a 3:1 binary divider, to produce 33.6 kc. timing signals as illustrated in curve B, FIG. 2. The output from divider 6 is coupled to a 2:1 divider 6, such as a flip flop divider, producing at its output a 16.8 kc. signal and, in fact, two 16.8 kc. signals; one as illustrated in curve C, FIG. 2, and the other time displaced with respect thereto as illustrated in curve D. FIG. 2. These two timing signals are complementary to each other and are coupled from the "1" output of the flip-flop of divider 7, curve C, FIG. 2, and from "O" output of the flip-flop of divider 7, curve D, FIG. 2. Connected directly to the output of clock 4 is a 9:1 divider 8, such as a 9:1 binary divider, which produces a 11.2 kc. output as illustrated in curve N, FIG. 2. The output of divider 8 is coupled to a 2:1 divider 9, such as a flip-flop divider, to produce a 5.6 kc. output as illustrated at curve T, FIG. 2.

Thus, when used in a multiplexer arrangement the basic frequency is provided by a master clock 4 which is divided down by using a divider chain including dividers 6, 7, 8 and 9 to provide the various timing signals necessary to produce the results in accordance with the principles of this invention.

The first group of plurality of channel pulses are provided by the time coincidence of the output of delay line 5, the output of divider 6 and the "1" output of divider 7 by activating gate 10 upon coincidence of these signals (curves A, B and C, FIG. 2) to produce the output as illustrated in curve E, FIG. 2, having a first repetition rate of 16.8 kc. The pulse generated at the output of gate 10 triggers blocking oscillator 11 which as is commonly known produces a very short duration pulse and, hence, a delay line distributor 12 which includes therealong ten taps to which are coupled ten pulse modulators 13 receiving from ten sources 14 analog signals to be multiplexed in pulse modulated form on a time division bases with the output from modulators 13 being coupled to OR gate 15 and, hence, to OR gate 16 prior to being coupled to OR gate 17 and mixer 18.

The second group of plurality of channel pulses at the first repetition rate is produced by time coincidence in gate 19 of the output of the delay line 5, the output of divider 6, and the "0" output of divider 7 (time coincidence of curves A, B, and D, FIG. 2) to produce a timing signal as illustrated in curve F, FIG. 2. This trigger pulse is then coupled to blocking oscillator 20 and, hence, to a delay line distributor 21 which through the cooperation of pulse modulators 22 and signal sources 23 produces ten pulse modulated channel signals at the output of OR gate 24 to be coupled to OR gate 16 and, hence to OR gate 17 and mixer 18.

The third group of plurality of channel pulses at the first repetition rate is generated by the cooperation of the time coincidence in AND gate 25 of the output of delay line 5 and the output of stretcher 26 coupled to the end of delay line distributor 12 (time coincidence of curves A and G, FIG. 2) and produces a timing waveform as illustrated in curve H, FIG. 2. Stretcher 26, as well as the other stretchers illustrated, increase the width of the blocking oscillator pulse at the output of the delay line distributors to be compatible with the width of the timing signal pulses and may be a monostable multivibrator triggered by the delayed blocking oscillator pulse to its unstable state which returns to its stable state after appropriate time to produce the desired pulse width. The output of gate 25 is coupled to a blocking oscillator 27 for triggering a delay line distributor 28 and, hence, through the cooperation of pulse modulators 29, source of signals 30 and OR gate 31 produces in time sequence ten channel pulse modulated signals. The output of OR gate 31 is coupled to OR gates 16 and 17 and then mixer 18.

The fourth group of plurality of channel signals at the first repetition rate is produced by the time coincidence in AND gate 32 of the output of delay line 5 and the output of stretcher 33 (time coincidence of curves A and I, FIG. 2). The output timing waveform of AND gate 32 is shown in curve J, FIG. 2. Through the cooperation of blocking oscillator 34 and time delay distributor 35 there is produced another group of ten channel pulse modulated signals through the cooperation of the ten sources of 36 and the modulators 37 whose outputs are coupled through OR gate 38 and, hence, to OR gates 16 and 17 prior to being coupled to mixer 18.

It can be seen from the foregoing description that means 1 through the coincidence of the output of delay line 5, divider 6 and divider 7 and the delayed counterparts from distributors 12 and 21 have produced four groups of ten channel signals for a total of forty channel signals with the basic repetition rate being determined by the time coincidence of the 100.8 kc. pulse at the output of delay line 5, the 33.6 kc. pulse at the output of divider 7, resulting in a repetition rate for these plurality of groups of channel pulses at a first repetition rate of 16.8 kc. for each channel signal.

The output of distributor delay line 28 is coupled through stretcher 39 and has a waveform as illustrated in curve K, FIG. 2. The output from distributor 35 is coupled through stretcher 40 and has the waveform as illustrated in curve L, FIG. 2. The output of the stretchers 39 and 40 are coupled to an OR gate 41 and produce a waveform as illustrated in curve M, FIG. 2. The output of stretchers 39 and 40 are at the repetition rate of the plurality of groups of channel pulses produced by means 1, namely, 16.8 kc. The output of OR gate 41 is then at a repetition rate of 33.6 kc.

The second means 2 of the channel pulse distributor of this invention is shown as being composed of an AND gate 42 coupled directly to the output of divider 8, to the output of delay line 5, and to the output of OR gate 41 to produce upon time coincidence of these various signals curves A, N and M, FIG. 2, the timing signal as illustrated in curve Q, FIG. 2. This timing output is coupled to blocking oscillator 43 for triggering thereof, to drive the delay line distributor 44.

AND gate 45 is coupled to a time delayed version of the output of divider 8, delayed by time delay device 46 producing at its output the waveform as illustrated in curve O, FIG. 2. Gate 45 also has an input the output from OR gate 41 and the output of delay 5 to produce a timing waveform, due to the time coincidence of the signals of curves A, O and M, FIG. 2, as illustrated in curve R, FIG. 2. This timing waveform triggers blocking oscillator 47 which drives delay line distributor 48.

AND gate 49 has coupled thereto a time delayed output of curve O, FIG. 2, produced by time delay device 50 which produces a waveform as illustrated in curve P, FIG. 2. The other inputs to AND gate 49 are the outputs of OR gate 41 and the output of delay line 5 to produce a timing pulse, upon time coincidence of these various signals (curve A, M and P, FIG. 2), as illustrated in curve S, FIG. 2. The timing waveform of gate 49 is coupled to trigger blocking oscillator 51 which in turn drives delay line distributor 52.

Thus, through the cooperation of AND gates 42, 45 and 49 timing pulses are produced for triggering the blocking oscillators 43, 47 and 51 upon time coincidence of the output of delay line 5, the output of OR gate 41 and the output of divider 8 directly employed or time delayed with respect thereto to provide a second repetition rate for the channel pulses produced in means 2 which is different then the repetition rate of the channel pulses produced in means 1, namely, having a value of 11.6 kc.

The channel pulses produced in delay line distributors 52 and 48 are coupled to pulse modulators 53 and 54 which receive from their associated sources of analog signals 55 and 56 those analog signals used to pulse modulate the channel pulses with the resultant output from modulators 53 and 54 being coupled to OR gates 57 and 58, the output from gates 57 and 58 are coupled to OR gate 59 and, hence, to OR gate 17 prior to being coupled to mixer 18. Delay line distributor 44, on the other hand, has eight of the channel pulses coupled to eight pulse modulators 60 which in cooperation with the analog signal sources 61 produce eight pulse modulated channel signals coupled to OR gate 62 and, hence, to OR gates 59 and 17 and mixer 18. The last two channel pulses produced in distributor 44 will be described hereinbelow to indicate how the framing pulse is generated.

The output of delay line 5 is coupled directly to a fine synchronizing signal generator 63, such as a monostable pulse generator, which produces a fine synchronizing signal or pulse at the rate of the master clock signal for each group of channel pulses produced by means 1 and 2 as depicted in curve CC, FIG. 2.

The frame synchronization is generated by coupling the ninth tap of delay line distributor 44 to AND gate 64 with the other input of AND gate 64 being coupled to the output of divider 9 to produce an output which is coupled to frame synchronizing signal generator 65, such as a bistable pulse generator, to produce the leading edge of the frame synchronization signal. The input to the generator 65 coupled from the tenth tap of delay line distributor 44 produces the trailing edge of the frame synchronization signal resulting in an output from generator 65 as illustrated in curve U, FIG. 2. The outputs of generators 63 and 65 are coupled to OR gate 66 and, hence, to mixer 18 which produces at its output a composite waveform substantially as illustrated for purposes of explanation in curve CC, FIG. 2.

The composite waveform of curve CC, FIG. 2, is coupled to an interim means 67. The term employed herein "interim means" is to indicate any means for storing the composite waveform, such as by recording or any other suitable type of storage apparatus, or any means for transmitting to a distant point over a suitable transmitting channel, after which it is received and demultiplexed to separate the individual channel signals from the composite multiplex signal. What happens to the signal between the multiplexing and demultiplexing is not important to the invention and we have used the expression "interim means" herein to designate whatever apparatus exists between the multiplexing and demultiplexing apparatus in accordance with the principles of this invention.

Referring to FIG. 3, there is illustrated therein the equipment that is employed in demultiplexing the composite multiplex signal (curve CC, FIG. 2) to route the appropriate channel pulse modulated signals to their associated demultiplexing and demodulating arrangements and ultimate utilization devices.

Referring to FIG. 3, means 1 includes a master clock and divider chain 3*a* which may take the form of master clock and divider chain 3 of FIG. 1, modified in that only the 33.6 kc., the two 16.8 kc. and the 11.2 kc. timing signals are used to develop the channel pulses for distribution by the channel pulse distributor of the demultiplexer arrangement of FIG. 3. The timing pulses of 100.8 kc. are provided at the output of sync selector 68 which is coupled to interim means 67 of FIG. 1 by either a recording device or a transmission arrangement. Thus, the source of master timing signals in the arrangement of FIG. 3 is the synch selector 68 and the means producing the other timing signals is master clock and divider chain 3*a*. The remainder of the means 1, as well as the means 2, is substantially the same as that described in connection with FIG. 1.

Briefly, the AND gate 10 upon coincidence of the 33.6 kc., the "1" output of 16.8 kc. and the output of sync selector 68 (curves A, B and C, FIG. 2) produces a timing waveform to trigger blocking oscillator 11 and produce the waveform illustrated in curve V for activating the delay line distributor 12 at a repetition rate of 16.8 kc.

The AND gate 19 recognizes time coincidence between the 33.6 kc. output, the "O" output of the 16.8 kc. divider and the output of sync selector 68 (curve A, B and D, FIG. 2) to produce a timing waveform to trigger blocking oscillator 20 and produce the waveform as illustrated in curve X, FIG. 2 for triggering the delay line distributor 21 at repetition rate of 16.8 kc.

AND gate 25 recognizes the coincidence between the output of stretcher 26 coupled to delay line distributor 21 and the output of sync selector 68 (curve G and A, FIG. 2) to trigger the blocking oscillator 27 and produce the timing signal as illustrated in curve W, FIG. 2 for delay line distributor 28 at a repetition rate of 16.8 kc. AND gate 32 recognizes the time coincidence between the output of stretcher 33 coupled to the output of delay line distributor 21 and the output of the sync selector 68 (curves I and A, FIG. 2) to produce a triggering pulse for blocking oscillator 34 which produces a timing signal as illustrated in curve Y, FIG. 2 for delay line distributor 35 at a repetition rate of 16.8 kc.

Delay line distributors 12, 21, 28 and 35 produce channel pulses in a predetermined time position for distribution to the channel pulse modulated signal demodulators 69, 70, 71 and 72.

Means 2 includes an AND gate 42 coupled to the output of OR gate 41 which in turn is coupled to the output of stretchers 39 and 40 coupled to delay line distributors 28 and 35, respectively. The other input of AND gate 42 is coupled to the output of sync selector 68 and thereby produces a triggering pulse (time coincidence of curves A, M and N, FIG. 2) to trigger blocking oscillator 43 to produce a delay line driver timing signal as illustrated in curve Z, FIG. 2 for application to delay line distributor 44.

The 11.2 kc. output of master clock and divider chain **3*a* is delayed by time delay device 46 for coupling to AND gate 45 which upon coincidence of pulses from the output of sync selector 68 and the output of OR gate 41 (curves A, M and O, FIG. 2) produces a triggering pulse for blocking oscillator 47 which produces in turn a driving pulse timing signal illustrated in curve BB, FIG. 2 for delay line distributor 48.**

The output of delay device 46 is further delayed in time by time delay device 50 to produce an output coupled to AND gate 49 which has its other two inputs coupled to the output of OR gate 41 and the output of sync selector 68, respectively, to produce a triggering pulse (upon time coincidence of curves A, P and M, FIG. 2) for blocking oscillator 51 to produce as illustrated in curve AA, FIG. 2 a timing signal for driving the delay line distributor 52.

Thus, as in the case of means 2 in the multiplex arrangement of FIG. 1, delay line distributors 52 and 48 each produces ten channel pulses for distribution to demodulators 73 and 74 to enable the demodulation of twenty channel pulse modulated signals grouped in two groups of ten each. Delay line distributor 44 produces eight channel pulses for coupling to the eight demodulators 75 for recovery of the appropriate channel pulse modulated signals received from interim means 67.

The composite waveform illustrated in curve CC of FIG. 2 is coupled from interim means 67 of FIG. 1 directly to demodulators 69 through 75 to demultiplex and demodulate the appropriate ones of the channel pulse modulated signals in the composite waveform for utilization in utilization devices 76 through 82.

As mentioned hereinabove, the master timing pulse is not delivered from the master clock and divider chain **3*a* in the demultiplex arrangement of FIG. 3 as it was in the multiplex arrangement of FIG. 1. Rather, the sync selector 68 provides the master timing signal by detecting the fine synchronizing pulses which were inserted into the composite wave train through the operation of generator 63 of FIG. 1. The detection and synchronization of master clock and divider chain 3*a* and the operation of sync selector 68 may be described as follows. The composite waveform is coupled from means 67 to low pass filter 83 set to resonate at the frame synchronization pulses repetition frequency. The output of filter 83 will eventually build up to have a sufficient amplitude to be recognized as the frame synchronizing pulses. The output from filter 83 is coupled to amplitude discriminator or detector 84 to produce the frame synchronizing pulses as detected in the composite multiplex waveform. The output of discriminator 84 triggers the blocking oscillator 85 to sharpen up the frame synchronizing pulse as detected. This frame synchronizing pulse is applied through delay line 86 and also is coupled to master and divider chain 3*a*** for synchronization thereof to the frame synchronizing pulse of the received composite multiplex waveform.

The composite waveform of means 67 is also coupled directly to AND gate 87, and the other input of AND gate 87 is coupled to OR gate 88. Initially, the frame synchronizing pulse delayed in delay line 86 is coupled to OR gate 88 and gated with the first fine synchronizing pulse adjacent thereto as illustrated at 89 of curve CC, FIG. 2. Thus, the output of AND gate 87 is the first fine synchroning pulse. Since the frame synchronizing pulse occurs only once every frame, and cannot have any influence on the detection of the remainder of the fine synchronizing pulses to provide the master timing pulse of 100.8 kc., the output of stretchers 26, 33, 39, 40, 90, 91 and 92 coupled to the output of the associated one of the delay line distributors is coupled to OR gate 93, to provide gating pulses through OR gate 88 for enabling the AND gate 87 to pass the fine synchronizing pulses contained in the composite waveform, which then is used as the master timing source for the generation of the channel pulses utilized in the remainder of means 1 and 2 to properly demultiplex and demodulate the pulse modulated channels present in the various groups of different repetition rates contained in the composite waveform at the output of mixer 18 as shown in curve CC, FIG. 2.

Referring to FIG. 4, there is illustrated therein a multiplex-demultiplex arrangement which when switch 94 is in the multiplex or M position as illustrated causes the channel pulse distributor associated therewith to operate as described hereinabove with respect to FIG. 1. The components of the channel pulse distributor coupled thereto being referenced by the same reference character as employed in FIGS. 1 and 3 to which reference should be made to determine the exact operation of the channel pulse distributor since repetition of the operation of FIG. 1 is believed not necessary to describe the operation of the channel pulse distributor of FIG. 4.

With switch 94 moved to the demodulator or D position the channel pulse distributor of this invention, as illustrated in FIG. 4, will operate in the same manner as described with reference to FIG. 3 and the various components of the channel pulse distributor will operate as described therewith and repetition of the description of the demultiplexing of channel pulse distributor with respect to FIG. 4 is believed not to be necessary since it would only be repetitious of the description of FIG. 3.

It should be noted, however, that the advantage of FIG. 4 is that only one set of AND gates, blocking oscillators, and delay line distributors is needed to provide the channel pulses for both multiplexing and demultiplexing with the channel pulses produced by the delay line distributors 12, 21, 28, 35, 52, 48 and 44 being fed in parallel to demodulators 69 through 75 and modulators 13, 22, 29, 37, 53, 54, and 60. Thus, if the interim means 67 is a recording device, it is possible to utilize the same channel pulse distributor to do its channel defining function at the modulators for recording on the interim means 67 the composite multiplex waveform generated. The same components are then used at a latter time to read off previously recorded composite multiplex waveforms with the co-operation of the demodulators 69 through 75. Thus, the arrangement can be used for multiplexing and subsequent demultiplexing of a previously recorded composite waveform, the recording and reading off the recording being done in sequence according to the position of switch 94.

It is also illustrated in the arrangement of FIG. 4 that a power supply 95 having an output to common equipment also has an output ganged with the switch 94 to selectively couple the power supply 95 to the multiplex equipment or to the demultiplex equipment depending upon which of the equipment is being operated.

It will also be observed in FIG. 4 that the position of switch 94 determines the origin of the source of master timing pulses. With the switch 94 in the position illustrated, the source of the master timing pulses of 100.8 kc. are derived directly from the master clock and divider chain while if the switch 94 is positioned in its demultiplex position the master timing source is derived from the fine synchronzing pulses through the operation of sync selector 68 as described hereinabove with respect to FIG. 3.

While we have described above the principles of our invention in connection with specific apparatus it is to be clearly understood that this description is made only by way of example and not as a limitation to the scope of our invention as set forth in the objects thereof and in the accompanying claims.

We claim:

1. A time division multiplex channel pulse distributor comprising:

a first source of master timing pulses having a predetermined repetition rate;

first means coupled to said source to produce a plurality of timing pulses having different repetition rates predeterminedly related to said predetermined repetition rate;

second means coupled to said source and said first means responsive to said master pulses and selected one of said plurality of timing pulses to produce for each frame of a time division multiplex signal a first plurality of channel pulses having a first repetition rate; and third means coupled to said source, said first means, and said second means responsive to said master pulses, other of said plurality of timing pulses, and at least one of said first plurality of channel pulses to produce for each frame of said multiplex signal a second plurality of channel pulses having a second given repetition rate different than said first given repetition rate.

2. A time division multiplex channel pulse distributor comprising:

first means to produce a first plurality of channel pulses having a first given repetition rate;

second means coupled to said first means to produce a second plurality of channel pulses having a second given repetition rate different than said first given repetition rate; and third means coupled to said first means and said second means producing frame pulses to define time division multiplex frames each encompassing said first and second plurality of channel pulses.

3. A time division multiplex channel pulse distributor comprising:

first means to produce for each frame of a time division multiplex signal a first plurality of channel pulses having a first given repetition rate;

second means coupled to said first means to produce for each frame of said multiplex signal a second plurality of channel pulses having a second given repetition rate different than said first given repetition rate;

a plurality of channel modulator means;

a plurality of channel demodulator means;

means coupled to said first means to couple said first plurality of channel pulses in parallel to given ones of said modulator means and given ones of said demodulator means; and means coupled to said second means to couple said second plurality of channel pulses in parallel to others of said modulator means and others of said demodulator means.

4. A time division multiplex channel pulse distributor comprising:

first means to produce for each frame of a time division multiplex signal a first plurality of groups of channel pulses having a first given repetition rate; and second means coupled to the said first means to produce for each frame of said mupltiplex signal a second plurality of groups of channel pulses having a second given repetition rate different than said first given repetition rate;

said first means including a source of master timing pulses having a predetermined repetition rate, third means coupled to said source to produce a plurality of timing pulses having different repetition rates predeterminedly related to said predetermined repetition rate, and fourth means coupled to said source and said third means responsive to said master timing pulses and selected ones of said plurality of timing pulses to produce said first plurality of groups of channel pulses; and said second means including fifth means coupled to said source, said third means and said fourth means responsive to said master timing pulses, another of said plurality of timing pulses and at least one channel pulse of said first plurality of groups of channel pulses to produce said second plurality of groups of channel pulses.

5. A distributor according to claim 4, wherein said fourth means is responsive to the time coincidence of said master timing pulses and said selected ones of said plurality of timing pulses to produce said first plurality of groups of channel pulses; and said fifth means is responsive to the time coincidence of said master timing pulses, said another of said plurality of timing pulses and said at least one channel pulse of said first plurality of groups of channel pulses to produce said second plurality of groups of channel pulses.

6. A time division multiplex channel pulse distributor comprising:

first means to produce for each frame of a time division multiplex signal a first plurality of groups of channel pulses having a first given repetition rate; and second means coupled to said first means to produce for each frame of said multiplex signal a second plurality of groups of channel pulses having a second given repetition rate different than said first given repetition rate;

said first means including a source of time division multiplex signals comprising frame synchronizing pulses defining the frame of said multiplex signal, a first plurality of groups of channel signals having said first given repetition rate included in each of said frames, a second plurality of groups of channel signals having said second given repetition rate included in each of said frames, and a fine synchronizing pulse for each group of said first and second plurality of groups of channel signals, third means coupled to said source to detect said frame pulses and said fine pulses, fourth means to produce a plurality of timing pulses having different repetition rates predeterminedly related to the repetition rate of said fine pulses, and fifth means coupled to said third means and said fourth means to produce said first plurality of groups of channel pulses; and said second means including sixth means coupled to said third means, said fourth means and said fifth means to produce said second plurality of groups of channel pulses.

7. A distributor according to claim 6, wherein said fourth means is coupled to said third means responsive to said frame pulses to synchronize the production of said timing pulses.

8. A distributor according to claim 6, wherein said fifth means is responsive to the time coincidence of said fine pulses and selected ones of said plurality of timing pulses to produce said first plurality of groups of channel pulses; and said sixth means is responsive to the time coincidence of said fine pulses, others of said plurality of timing pulses and at least one channel pulse of said first plurality of groups of channel pulses to produce said second plurality of groups of channel pulses.

9. A time division multiplex channel pulse distributor comprising:

first means to produce for each frame of a time division multiplex signal a first plurality of groups of channel pulses having a first given repetition rate;

second means coupled to said first means to produce for each frame of said multiplex signal a second plurality of groups of channel pulses having a second given repetition rate different than said first given repetition rate;

a first plurality of groups of channel modulator means;

a second plurality of groups of channel modulator means;

a first plurality of groups of channel demodulator means;

a second plurality of groups of channel demodulator means;

means coupled to said first means for coupling said first plurality of groups of channel pulses in parallel to said first plurality of groups of modulator means and said first plurality of groups of demodulator means; and means coupled to said second means to couple said second plurality of groups of channel pulses in parallel to said group of modulator means and said second plurality of groups of demodulator means.

10. A time division multiplex channel pulse distributor comprising:

first means to produce a first plurality of groups of channel pulses, each channel pulse of said first plurality of groups having a first given repetition rate;

second means coupled to said first means to produce a second plurality of groups of channel pulses, said channel pulses of said second plurality of groups having a second given repetition rate different than said first given repetition rate;

third means coupled to said first means to produce a synchronizing pulse for each group of said first and second plurality of groups; and fourth means coupled to said first means and said second means to produce frame pulses defining time division multiplex frames each of which encompasses said first and second plurality of groups of channel pulses.

11. A time division multiplex channel pulse distributor comprising:

first means to produce a plurality of timing pulses having different repetition rates;

second means coupled to said first means responsive to certain ones of said timing pulses to produce for each frame of a time division multiplex signal a first plurality of channel pulses having a first given repetition rate; and third means coupled to said first means and said second means responsive to one of said certain ones of said timing pulses, others of said timing pulses, and certain ones of said plurality of said first channel pulses to produce for each frame of said multiplex signal a second plurality of channel pulses having a second given repetition rate different than said first given repetition rate.

12. A time division multiplex channel pulse distributor comprising:

first means to produce a plurality of timing pulses having different repetition rates;

second means coupled to said first means to produce a a first plurality of channel pulses having a first given repetition rate;

third means coupled to said first means and said second means to produce a second plurality of channel pulses having a second given repetition rate different than said first given repetition rate; and means coupled to said third means and said first means to produce frame pulses defining time division multiplex frames each of which encompasses said first and second plurality of channel pulses.

13. A time division multiplex channel pulse distributor comprising:

first means to produce a plurality of timing pulses having different repetition rates;

second means coupled to said first means responsive to the time coincidence of given ones of said plurality of timing pulses to produce a first plurality of channel pulses having a first given repetition rate; and means responsive to the time coincidence of others of said plurality of said timing pulses and a predetermined output of said second means to produce a second plurality of channel pulses having a second given repetition rate different than said first given repetition rate; and means coupled to said third means and said first means responsive to the time coincidence of at least one channel pulse of said second plurality of channel pulses and one of said plurality of timing pulses to produce frame pulses defining time division multiplex frames each of which encompasses said first and second plurality of channel pulses.

14. A time division multiplex channel pulse distributor comprising:

first means to produce a plurality of timing pulses having different repetition rates;

second means coupled to said first means to produce a first plurality of groups of channel pulses having a first given repetition rate; and third means coupled to said first means and said second means to produce a second plurality of groups of channel pulses having a second given repetition rate different than said first given repetition rate;

means coupled to said third means and said first means to produce frame pulses defining time division multiplex frames each of which encompasses said first and second plurality of groups of channel pulses; and means coupled to said first means to produce a synchronizing pulse for each group of said first and second plurality of groups of channel pulses.

15. A time division multiplex channel pulse distributor comprising:

first means to produce a plurality of timing pulses having different repetition rates;

second means coupled to said first means responsive to the time coincidence of given ones of said plurality of timing pulses to produce a first plurality of groups of channel pulses having a first given repetition rate;

third means coupled to said first means and said second means responsive to the time coincidence of others of said plurality of said timing pulses and a predetermined output of said second means to produce a second plurality of groups of channel pulses having a second given repetition rate different than said first given repetition rate;

means coupled to said third means and said first means responsive to a given one of said plurality of timing pulses and selected channel pulses of said second plurality of groups of channel pulses to produce frame pulses defining time division multiplex frames each of which encompasses said first and second plurality of groups of channel pulses; and means coupled to said first means responsive to a given one of said plurality of timing pulses to produce a synchronizing pulse for each group of said first and second plurality of groups of channel pulses.

16. A time division multiplex channel pulse distributor comprising:

a source of master timing pulses having a predetermined repetition rate;

first means to produce a plurality of timing pulses having different repetition rates predeterminedly related to said predetermined repetition rate;

second means coupled to said source and said first means to produce a first plurality of channel pulses having a first given repetition rate;

third means coupled to said source, said first means and said second means to produce a second plurality of channel pulses having a second given repetition rate different than said first given repetition rate; and means coupled to said third means and said first means to produce frame pulses defining time division multiplex frames each of which encompasses said first and second plurality of channel pulses.

17. A time division multiplex channel pulse distributor comprising:

a source of master timing pulses having a predetermined repetition rate;

first means to produce a plurality of timing pulses having different repetition rates predeterminedly related to said predetermined repetition rate;

second means coupled to said source and said first means to produce a first plurality of groups of channel pulses having a first given repetition rate;

third means coupled to said source, said first means and said second means to produce a second plurality of groups of channel pulses having a second given repetition rate different than said first given repetition rate;

means coupled to said third means and said first means to produce frame pulses defining time division multiplex frames each of which encompasses said first and second plurality of groups of channel pulses; and means coupled to said source to produce a synchronizing pulse for each group of said first and second plurality of groups of channel pulses.

18. A time division multiplex channel pulse distributor comprising:

a source of master timing pulses having a predetermined repetition rate;

first means to produce a plurality of timing pulses having different repetition rates predeterminedly related to said predetermined repetition rate;

second means coupled to said source and said first means responsive to the time coincidence of said master timing pulses and certain ones of said plurality of timing pulses to produce a first plurality of groups of channel pulses having a first given repetition rate;

third means coupled to said source, said first means and said second means responsive to the time coincidence of said master timing pulses, certain other ones of said plurality of said timing pulses, and a predetermined output of said second means to produce a second plurality of groups of channel pulses having a second given repetition rate different than said first given repetition rate;

means coupled to said third means and said first means responsive to a given one of said plurality of timing pulses and selected channel pulses of said second plurality of groups of channel pulses to produce frame pulses defining time division multiplex frames each of which encompasses said first and second plurality of groups of channel pulses; and means coupled to said source responsive to said master timing pulses to produce a synchronizing pulse for each group of said first and second plurality of groups of channel pulses.

References Cited

UNITED STATES PATENTS

| | | | |
|---|---|---|---|
| 3,370,128 | 2/1968 | Morita et al. -------- | 179—15 |
| 3,305,639 | 2/1967 | Jongkind et al. ------ | 179—15 |

ROBERT L. GRIFFIN, *Primary Examiner.*

WILLIAM S. FROMMER, *Assistant Examiner.*

U.S. Cl. X.R.

178—50, 53; 328—154, 97